E. N. JACK.
Wagon-Brakes.

No. 144,849. Patented Nov. 25, 1873.

Witnesses.
Oscar Snell
David McClung

Inventor:
Edwin N. Jack

UNITED STATES PATENT OFFICE.

EDWIN N. JACK, OF WILLIAMSBURG, OHIO.

IMPROVEMENT IN WAGON-BRAKES.

Specification forming part of Letters Patent No. 144,849, dated November 25, 1873; application filed July 21, 1873.

*To all whom it may concern:*

Be it known that I, EDWIN N. JACK, of Williamsburg, in the county of Clermont and State of Ohio, have invented a Wagon-Brake, of which the following is a specification:

The objects of my invention are to provide a brake which shall decrease the strain upon the springs caused by the forward tendency of the bed in descending grades, and to have maximum rigidity by a more perfect arrangement of parts to suit the strains and oscillations incident to land conveyances.

Figure 1:
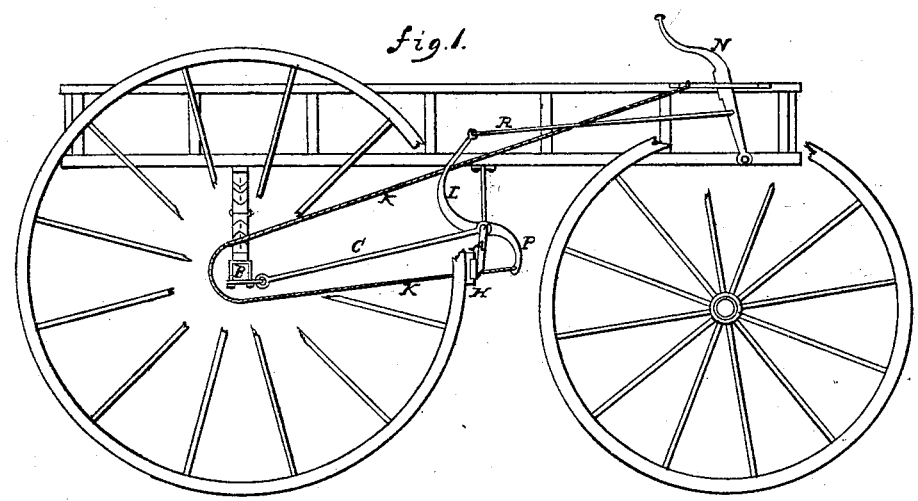
Figure 2:
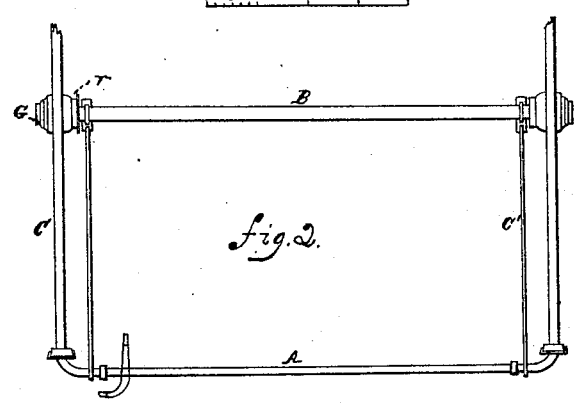
Figure 3:
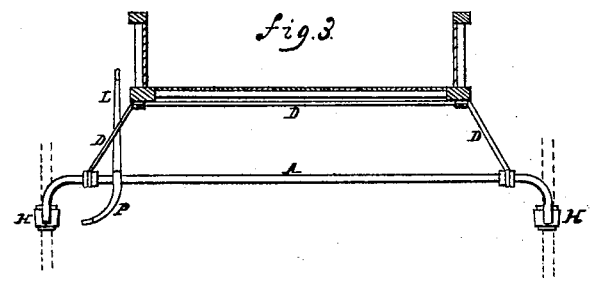

Figure 1 is a longitudinal view of a brake applied to a spring-wagon, embodying my improvement. Fig. 2 is a top view, showing attachment to axle. Fig. 3 is a transverse view, showing the manner of suspending the brake-shaft beneath the bed.

Similar letters of reference indicate corresponding parts.

A represents the brake-shaft; B, the axle; C C', brace-rods from axle to brake-shaft; D, rod for suspending the brake-shaft under the bed; L, lever on brake-shaft; N, lever attached to bed and connected to L by rod R; H, rub-block.

This brake is operated by the application of power to the lever N, the same as with other brakes of its class. The action of the brake on the bed and springs is, however, different. Power being applied to the lever N, and communicated to A by R and L, it is obvious that as one end of the rod C is attached to the brake-shaft A, and the other to the axle B, the action of the rub-block on the wheel throws a parting strain on the rod C, thus preventing any longitudinal motion with the bed of the brake-shaft, the fulcrum of the lever N in the meantime acting to throw the bed backward. The downward pressure of the brake-shaft, caused by the friction of the rub-block, is received by the suspension-rod D, which, with the rods C C', being movable in their attachments, allows for the various motions to which the bed is subjected.

The ends of rod D giving bearing to brake-shaft A near the rub-block H, it is obvious that greater rigidity is assured with lighter material than if the shaft were attached directly to the bed.

The principle of operating brakes by friction can be applied to this invention, as in Fig. 1. To the lever P is attached a wire rope, which, passing partially around the hub, is brought forward and attached to the bed. It is obvious that, by the application of a very small force to the rope, sufficient power can be obtained by the friction on the hub to lock the wheels.

In Fig. 2 is a flange, r, on the hub G, to prevent the rope from moving sidewise, thus confining it to its place.

I claim as my invention—

1. The movable suspension-rod D, constructed to operate as and for the purposes set forth.

2. The brace-rods C C', in combination with the suspension-rod D, as and for the purpose set forth.

EDWIN N. JACK.

Witnesses:
OSCAR SNELL,
DAVID McCLUNG.